Aug. 2, 1960 R. M. FULLAWAY 2,947,380
WASH TANK, AND OIL, WATER AND GAS SEPARATOR
Filed May 29, 1958 2 Sheets-Sheet 1

INVENTOR.
RICHARD M. FULLAWAY
BY
Hazard & Miller
ATTORNEYS

Aug. 2, 1960  R. M. FULLAWAY  2,947,380
WASH TANK, AND OIL, WATER AND GAS SEPARATOR
Filed May 29, 1958  2 Sheets-Sheet 2
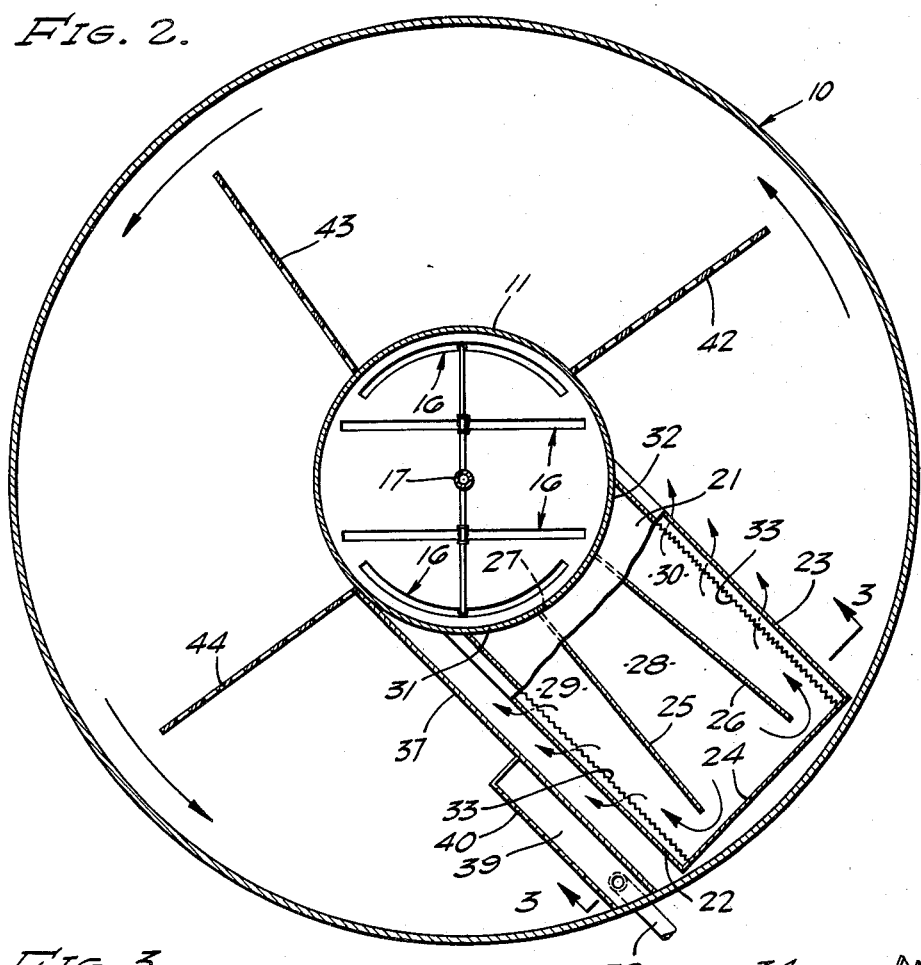
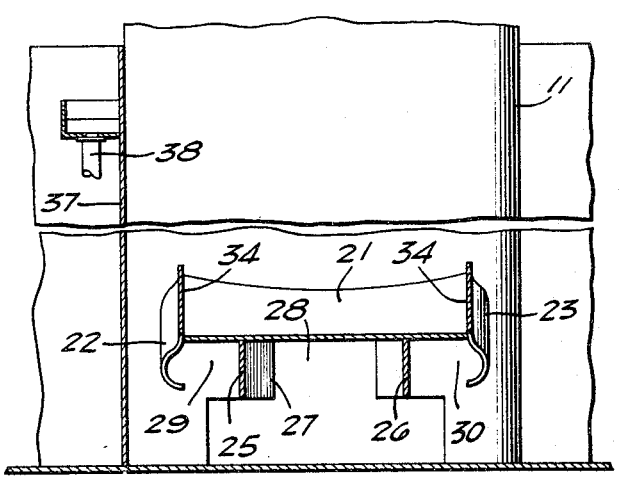
INVENTOR.
RICHARD M. FULLAWAY
BY
Hazard & Miller
ATTORNEYS United States Patent Office 2,947,380
Patented Aug. 2, 1960

2,947,380

WASH TANK, AND OIL, WATER AND GAS SEPARATOR

Richard M. Fullaway, Los Angeles, Calif., assignor to Superior Tank & Construction Company, Los Angeles, Calif., a corporation of California Filed May 29, 1958, Ser. No. 738,682

8 Claims. (Cl. 183—2.7)

This invention relates to a wash tank, and oil, water, and gas separator.

The invention may be regarded as an improvement over the wash tank disclosed in United States Letters Patent No. 2,706,015, issued April 12, 1955, to Claud H. Bills.

One object of the present invention is to provide an improved wash tank wherein an influent in the nature of crude oil produced from oil wells containing oil, water, either salt or fresh, entrained gas and sediment can be introduced into the tank and suitably separated so that oil removed from the tank will meet the local pipeline requirements which usually set a maximum amount of water that may be present in the oil.

In accordance with the present invention, the influent is introduced into the top of an upright conduit frequently referred to in this art as a balancing column where free and entrained gas is released at atmospheric pressure or substantially so and may be removed from the tank through a vapor recovery outlet to a gas manifold. Thereafter, the influent is caused to pass through a bed of rache rings, saddles, or excelsior coated or impregnated with a hydrophyllic resin such as for example urea formaldehyde to accelerate the coalescence of free water in the oil foam before the influent reaches the fluid level in the conduit or balancing column. As the influent descends through the balancing column it is somewhat conditioned by heaters disposed therein and finds exit near the bottom of the balancing column through a laterally projecting spreader.

Another object of the present invention is to provide a novel and relatively simple form of spreader which consists of a structure providing one or more open-bottomed passages through which the influent is caused to pass. These passages are of gradually increasing cross-sectional size so that the velocity of the influent therethrough is constantly decreasing as the influent passes along the lengths of the passages. The water content of the influent that is disposed to settle therefrom by gravity is free to do so during this prolonged passage of the influent through the spreader at the constantly decreasing velocity.

Another object of the invention is to provide a novel construction of spreader wherein oil and water expelled from the open bottom of the spreader is caused to film on side walls of the spreader so that entrained water particles will have an opportunity to coalesce with each other and with the wash water in the bottom of the tank.

Still another object of the invention is to provide a spreader having the above-mentioned characteristics wherein the side walls over which the oil is caused to film as it ascends terminate at their top edges in serrations so that the oil rising through the wash water will rise from the points of the serrations in the form of streams of oil droplets of very small size enabling entrained water particles to coalesce with each other and with the wash water through which the oil particles are ascending.

Another object of the invention is to provide a wash tank wherein after the oil has been caused to pass through the spreader having the above-mentioned characteristics, is also caused to pass very slowly around the tank and around the upright conduit or balancing column without channeling. This movement is designed to take place very slowly affording an opportunity for entrained water to settle out of the oil by gravity before reaching a skimmer designed to pass only surface oil which, at the time it reaches the skimmer, is relatively free of water. Provision is made for removing water from the tank so as to maintain the level of wash water at substantially a constant level. After passing through the skimmer the oil is conducted from the tank and is acceptable to the usual pipeline.

With the foregoing and other objects in view, which will be made manifest in the following detailed description and specifically pointed out in the appended claims, reference is had to the accompanying drawings for an illustrative embodiment of the invention, wherein:

Fig. 2 is a horizontal section taken substantially upon the line 2—2 upon Fig. 1 in the direction indicated;

Fig. 3 is a vertical section taken substantially upon the line 3—3 upon Fig. 2 in the direction indicated; and Fig. 4 is a partial view in perspective illustrating a portion of one of the side walls of the spreader.

Figure 1:
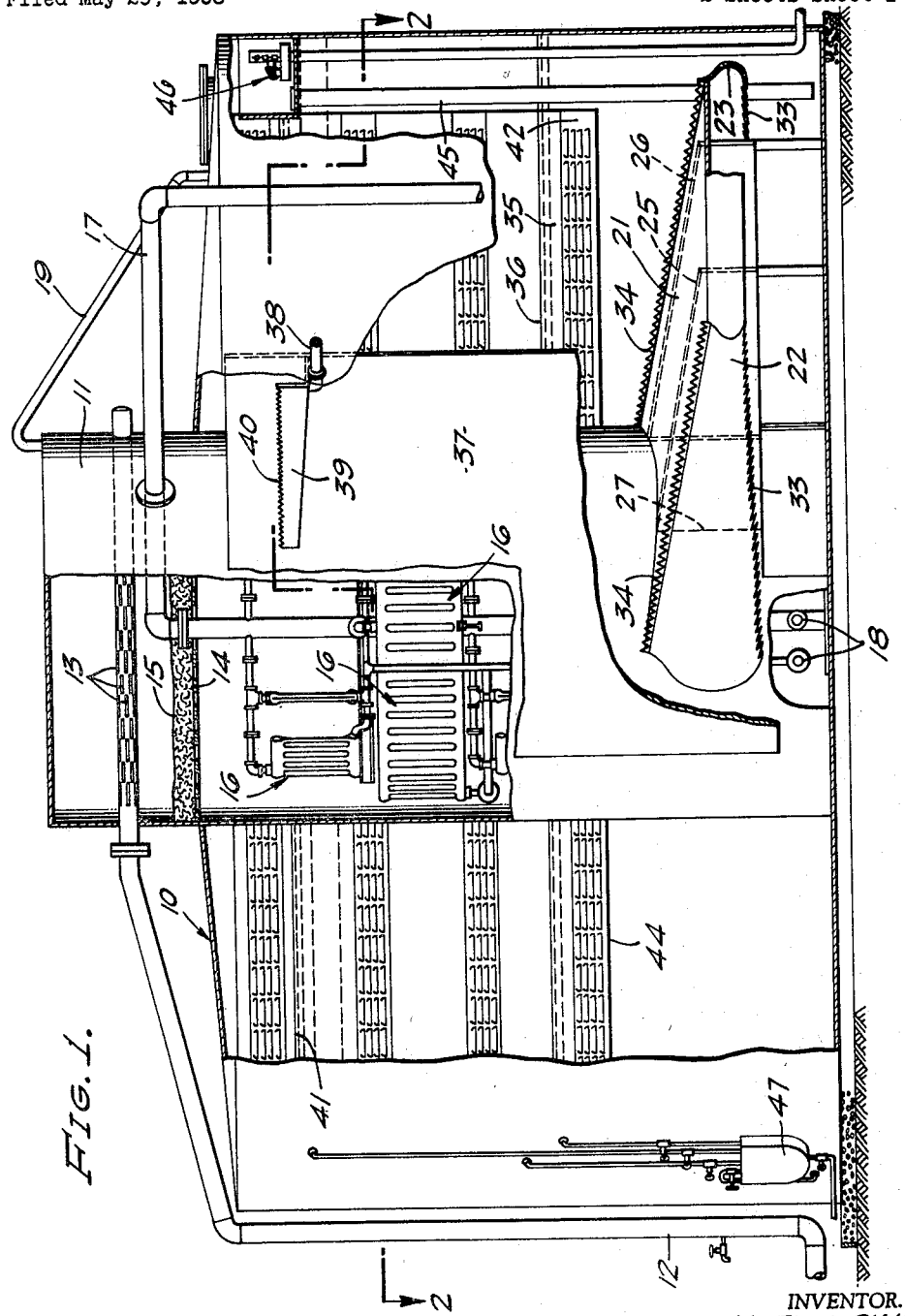
Figure 1 is a view in side elevation of the improved wash tank embodying the present invention, parts being broken away and shown in vertical section.

Referring to the accompanying drawings wherein similar reference characters designate similar parts throughout, the improved wash tank comprises a tank generally indicated at 10. Adjacent the center of this tank there is an upright conduit 11 defining within the tank what is popularly referred to in this art as a balancing column. The influent which may be crude oil as received from an oil well, is introduced into the tank through an inlet pipe 12 which is perforated as indicated at 13 in the top of the conduit 11 to distribute the influent over a perforated plate or rack 14 which supports a bed 15 of rache rings, saddles, or excelsior coated or impregnated with a hydrophyllic resin such as urea formaldehyde or "melamine" plastic. Beneath the perforated plate or rack 14 there are one or more heaters 16 which are supplied with steam or hot water through a pipe 17. Outlets for steam and condensate from these heaters are indicated at 18.

The hydrophyllic resin in the bed 15 is employed to accelerate the coalescence of free water in the oil foam before the influent reaches the normal fluid level in the conduit 11 or balancing column. The heaters 16 are intended to further condition the oil in the course of its descent through the balancing column prior to reaching the bottom of the balancing column and entering the spreader. Gas that is released from the influent adjacent the top of the balancing column is conducted through a vapor recovery outlet 19 to a gas manifold.

The spreader consists of an inclined top plate 21 extending laterally from one side of the bottom of the conduit 11. At the sides of the spreader there are tapered side walls 22 and 23. An end wall 24 connects the side walls and the top plate 21. The spreader has an open bottom. Between the two side walls 22 and 23 there are radially divergent partitions 25 and 26 which are connected to the top plate and to the side edges of an opening 27 in the bottom of the conduit 11. By reason of the fact that these partitions diverge radially they define therebetween a passage 28 that is of constantly increasing cross-sectional size so that as the influent reaches the opening 27 and passes outwardly between these partitions, its velocity is constantly and gradually decreased. The partitions 25 and 26 terminate short of the end wall 24 so that the influent, after it reaches the outer end of passage 28 may reversely flow around the ends of the partitions 25 and 26 and enter passages 29 and 30 which are respectively between partition 25 and side wall 22 and between partition 26 and side wall 23. These passages 29 and 30 likewise increase in cross-sectional size from their outer ends inwardly so that flow therethrough is also of constantly decreasing velocity. Passages 29 and 30 terminate at 31 and 32, respectively, which are portions of the bottom of conduit 10 at the sides of the opening 27. If the passages 28, 29, and 30 are not designed to be of constantly increasing size measured along the direction of flow therethrough at all events they should not be of decreasing size so as to bring about increase in velocity of the influent.

A feature of the present invention resides in the formation of the sides 22 and 23. These sides have perforations 33 at their bottom edges and are bent or formed so as to bulge outwardly immediately above these serrated edges so as to present outwardly convex external surfaces. Near their tops they are bent inwardly and then upwardly and are serrated as indicated at 34, these serrations projecting upwardly a short distance above the top plate 21. In effect, therefore, the sides are outwardly convex near their bottoms and are outwardly concave near their tops. This construction enables the influent to escape between the serrations 33 as the influent proceeds slowly in an inward direction through the passages 29 and 30. The influent escaping between the serrations 33 tends to rise in the wash water 35 that is below the oil and water interface 36. In so doing, the oil content of the influent is induced to film itself or spread itself over the outwardly convex surfaces of the sides 22 and 23. This filming action is conducive to the water particles of the influent coalescing with each other and with the wash water 35. As the filmed oil rises in contact with the convex portions of the sides 22 and 23 it encounters the concave portion near the top serrations 34 and tends to rise therefrom. However, most of the oil continues to adhere to the sides and to rise thereon and on the serrations 34 rising to the points of the serrations 34 from which points the oil separates itself from the sides and rises through the wash water in the form of a plurality of streams of minute oil globules. This action is also conducive to the coalescing of water particles with each other and with the wash which particles may still be present in the oil globuless. The oil globules rise through the wash water 35 and through the oil and water interface 36.

A solid or imperforate partition 37 connects the conduit 11 with the tank wall 10 on one side of the spreader so that oil that has been induced to separate from the water by the spreader and which has risen from the spreader is caused to pass from the spreader side of partition 37 around conduit 11 before it reaches the oil outlet 38.

A skimmer 39 is mounted on the opposite side of partition 37 from that side on which the spreader is located. This skimmer is merely in the form of an open-topped box having serrated top edges indicated at 40 and is arranged at the approximate oil level indicated at 41 in the tank 10. Radial louvered baffles 42, 43, and 44 extend radially from conduit 11 toward the walls of tank 10. These baffles do not necessarily extend entirely to the tank walls as indicated clearly in Fig. 2. The function of these baffles is to retard and baffle flow in tank 10 around conduit 11 so that oil rising from the spreader will not channel its way to the oil outlet 38. The baffles 42, 43, and 44 assist in causing the flow to be slow and well distributed, thus affording any water in the oil an adequate opportunity to drop out and mix with the wash water 35 before reaching the skimmer 39. Consequently, oil reaching the oil outlet 38 is comparatively free of water. The water is removed from the bottom of the tank through a water outlet 45 and egress through this water outlet is controlled or adjusted by an adjustable float valve generally indicated at 46.

The construction illustrated at 47 is merely a sampling box through which samples of the contents of the tank 10 can be taken at various desired elevations.

The constructions at 45, 46, and 47 are more or less conventional in wash tanks and consequently are not particularly described.

From the above-described construction it will be appreciated that an improved wash tank or oil, water, and gas separator has been provided which is of relatively simple construction yet is highly efficient in its operation in that, after the influent has been conditioned in the balancing column 11 it is then caused to flow at relatively slow velocity through the spider. In escaping from the bottom of the spider the oil content is induced to film itself on the convex sides of the spider and as it rises therefrom to leave the spider in the form of a plurality of streams of oil globules which rise from the points of the serrations 34. This filming or spreading of the oil and its ultimate rising in the form of streams of small globules is conducive to causing the water particles to coalesce with each other and with the wash water 35 with the result that the separation of water from oil is highly efficient. Even after the influent has been subjected to this treatment by the spider the slow travel of the oil around conduit 11 through and around the louvered baffles 42, 43, and 44 is such as to afford an excellent opportunity for water particles still remaining in the oil to drop out before the oil reaches the skimmer 39 and the oil outlet 38.

Various changes may be made in the details of construction without departing from the spirit and scope of the invention as defined by the appended claims.

I claim:

1. In a device of the class described, an upright conduit through which an influent is caused to descend, a spreader extending laterally from adjacent the bottom thereof, said spreader having a top, sides, and an open bottom and providing at least one passage of gradually increasing cross-sectional area through which the velocity of the influent may gradually decrease, the sides being outwardly convex near their bottom edges and outwardly concave near their top edges.

2. In a device of the class described, an upright conduit through which an influent is caused to descend, a spreader extending laterally from adjacent the bottom thereof, said spreader having a top, sides, and an open bottom and providing at least one passage of gradually increasing cross-sectional area through which the velocity of the influent may gradually decrease, the top edges of the sides being serrated.

3. In a device of the class described, an upright conduit through which an influent is caused to descend, a spreader extending laterally from adjacent the bottom thereof, said spreader having a top, sides, and an open bottom and providing at least one passage of gradually increasing cross-sectional area through which the velocity of the influent may gradually decrease, the top and bottom edges of the sides being serrated and the sides being outwardly convex between the serrated top and bottom edges.

4. In a device of the class described, an upright conduit through which an influent is caused to descend, a spreader at the bottom of the conduit into which the influent is discharged, said spreader having sides, top and an open bottom, the sides being outwardly convex and having serrations at the top edges thereof.

5. In a device of the class described, an upright conduit through which an influent is caused to descend, a spreader at the bottom of the conduit into which the influent is discharged, said spreader having sides, top and an open bottom, the sides being outwardly convex and having serrations at the top and bottom edges thereof.

6. In a device of the class described, a tank having an upright conduit therein, means for introducing an influent into the upper end of the conduit, a spreader extending laterally from one side of the conduit adjacent the bottom thereof, said spreader having sides, top and open bottom, the sides being outwardly convex and having the top edges thereof serrated, a partition connecting the conduit with a wall of the tank on one side of the spreader, a skimmer on the opposite side of the partition from the spreader adjacent the top thereof, baffles in the tank for baffling flow from the spreader toward the skimmer, said skimmer having a wall the top edge of which is serrated, and means for conducting oil from the skimmer.

7. In a device of the class described, a tank having an upright conduit therein, means for introducing an influent into the upper end of the conduit, a spreader extending laterally from one side of the conduit adjacent the bottom thereof, said spreader having sides, top, and open bottom, the sides being outwardly convex and having the top and bottom edges thereof serrated, a partition connecting the conduit with a wall of the tank on one side of the spreader, a skimmer on the opposite side of the partition from the spreader adjacent the top thereof, baffles in the tank for baffling flow from the spreader toward the skimmer, said skimmer having a wall the top edge of which is serrated, and means for conducting oil from the skimmer.

8. In a device of the class described an upright tank, an upright conduit disposed therein, means for supplying an influent to the top of the conduit for descent therein, a spreader at the bottom of the conduit into which the conduit discharges, said spreader providing at least one open bottomed passage the sides of which diverge, the sides of the passage having serrated bottom edges and being outwardly convex and having outwardly concave surfaces immediately below serrated top edges.

References Cited in the file of this patent

UNITED STATES PATENTS

| 2,165,703 | Holmes | July 11, 1939 |
| 2,284,737 | Hirshstein | June 2, 1942 |
| 2,353,833 | Kimmell | July 18, 1944 |
| 2,706,015 | Bills | Apr. 12, 1955 |